United States Patent [19]
Menard

[11] 4,448,358
[45] May 15, 1984

[54] HIGH SPEED FLUID GRINDING AND DISPERSER MILL

[75] Inventor: Jean G. Menard, Quebec, Canada

[73] Assignee: NL Chem Canada, Inc., Montreal, Canada

[21] Appl. No.: 168,219

[22] Filed: Jul. 10, 1980

Related U.S. Application Data

[63] Continuation-in-part of Ser. No. 62,344, Jul. 31, 1979, abandoned.

[51] Int. Cl.³ .................................................. B02C 18/10
[52] U.S. Cl. .................................. 241/39; 241/46.04; 241/46.11; 241/46.17; 241/258; 241/284
[58] Field of Search ................. 241/5, 40, 48, 46 R, 241/46 B, 46.02, 46.08, 46.11, 46.17, 275, 282.1, 282.2, 258, 257 R, 284, 46.04, 39; 106/300, 309; 423/610

[56] References Cited

U.S. PATENT DOCUMENTS

| | | |
|---|---|---|
| 2,216,921 | 10/1940 | Marvel . |
| 2,316,769 | 4/1943 | Chilson . |
| 2,417,078 | 3/1947 | Jones ................................. 241/48 |
| 2,553,582 | 5/1951 | Heller et al. . |
| 3,161,402 | 12/1964 | Willems . |
| 3,179,380 | 4/1965 | Drayer . |
| 3,298,618 | 1/1967 | Talpey . |
| 3,432,109 | 3/1969 | Geissel . |
| 3,638,917 | 2/1972 | Osten . |
| 3,741,485 | 6/1973 | Gage et al. ........................ 241/5 X |
| 3,801,286 | 4/1974 | Amolick et al. . |
| 4,214,712 | 7/1980 | van Hoorn ................... 241/46.17 X |
| 4,288,254 | 9/1981 | Gladu .............................. 423/610 X |

*Primary Examiner*—Mark Rosenbaum
*Attorney, Agent, or Firm*—Burns, Doane, Swecker & Mathis

[57] ABSTRACT

A continuous high speed grinding and disperser mill and classifier for fluids is enclosed. The mill permits a high flow rate and thus does not require cooling. It comprises an enclosed vessel having an annular wear ring in the approximate center of the vessel, a shaft rotatable about a vertical axis extending into the vessel terminating at an end in the approximate center of the vessel, an impeller attached to the end of the shaft adapted to rotate within the wear ring, the impeller being in the form of a circular disc with a plurality of shear blades at the periphery producing a high shear zone between the blades and the wear ring. An inlet is provided in the vessel directly below the impeller on the vertical axis and an outlet in the vessel positioned at a predetermined height directly above the impeller on the vertical axis such that a flow of fluid from the inlet to the outlet passes through the high shear zone. Means are provided to rotate the shaft and impeller.

10 Claims, 1 Drawing Figure

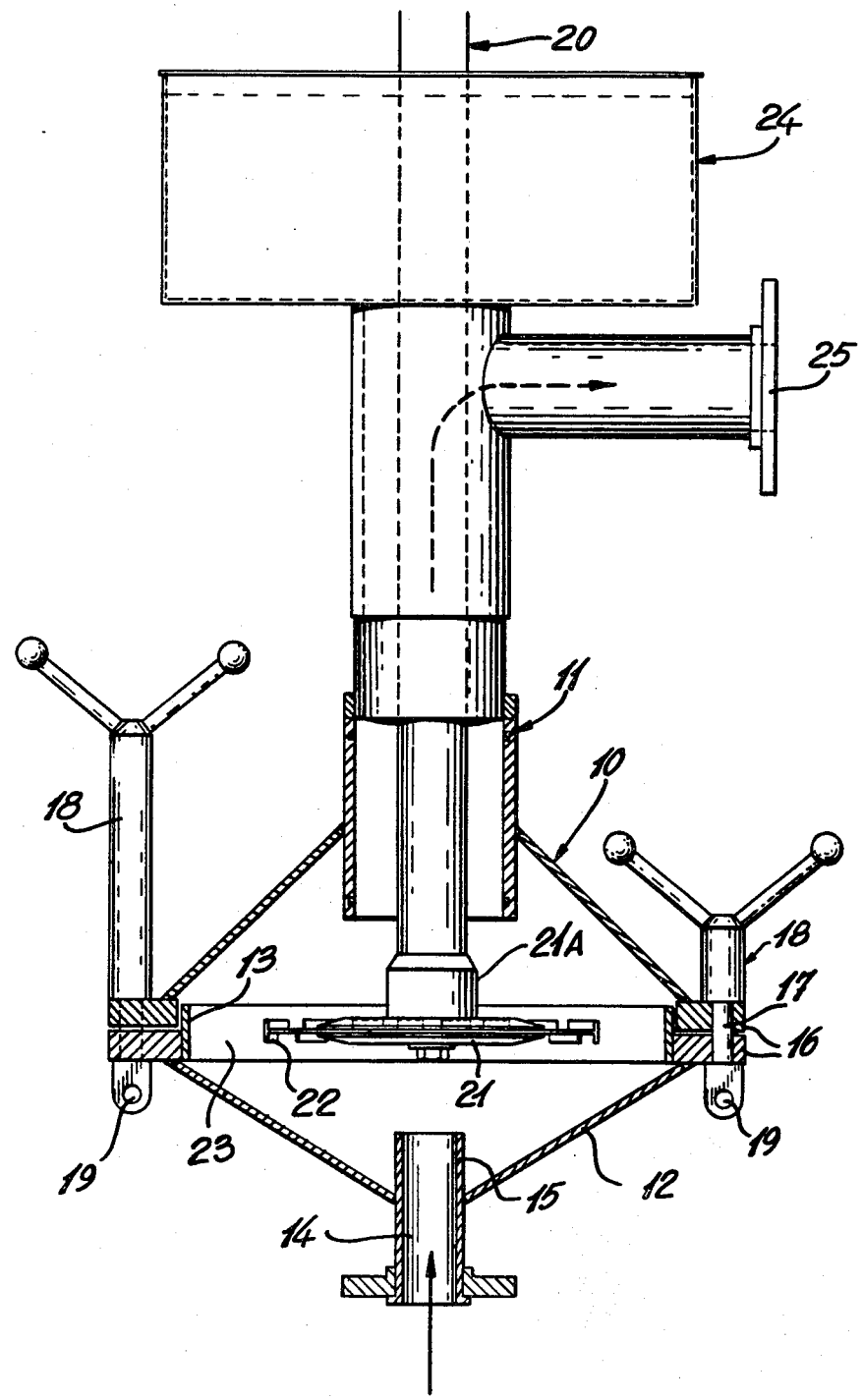

HIGH SPEED FLUID GRINDING AND DISPERSER MILL

This is a continuation-in-part of application Ser. No. 62,344 filed July 31, 1979, now abandoned.

The present invention relates generally to an apparatus for grinding, dispersing and classifying fluid materials. More particularly the present invention is concerned with a device for continuous de-agglomeration and dispersion of high solids composition such as pigments to a fine slurry, and grinding the slurry to reduce the size of the particles. The device also permits the particle size to be varied.

Various devices are well known in the art for grinding or dispersing homogeneous mixes, emulsions and the like. In the case of grinding such devices include ball mills, roller mills, vibratory mills, sonic agitators, homogenizers, mixers and the like. One device for dispersing materials is disclosed by Osten in U.S. Pat. No. 3,638,917 wherein a method of continuous high shear dispersion of materials is obtained by allowing materials to follow a consistantly dynamic centrally curved path in which the materials are subjected to a zone of high shear action. Osten's device does not act as a classifier. It has no variable features and the intensity of grinding can only be varied by changing the speed of the impeller. Furthermore, the device produces too much heat for use on finished titanium dioxide slurries and the like and has a low capacity.

It is the purpose of the present invention to provide a high capacity continuous high speed grinding and disperser mill for fluid materials wherein the materials pass once through a high shear zone, and yet this single pass through the high shear zone is sufficient to de-agglomerate and disperse high solids compositions to such an extent that titanium dioxide pigment slurries do not settle out after this dispersion step. The mill has a variable outlet which permits variation in the particle size discharging and thus allows the mill to act as a classifier. Only a small amount of heat is produced by this device and the flow through the mill is such that no cooling jacket is required to cool the mill. The high flow capacity allows a large quantity of fluid material to pass through the mill in a short time period. Furthermore, the mill itself is small in size for its capacity, easy to dismantle, is self draining and unlike the Osten device has sides which are only curved in one plane and thus is cheaper to fabricate compared with mills having sides curved in two planes. The mill uses standard and commercially available equipment and does not admit air into the slurry. Contamination is also reduced to a minimum.

The present invention provides a continuous high speed grinding and disperser mill and classifier for fluids comprising, an enclosed vessel having an annular wear ring in the approximate center of the vessel, a shaft rotatable about a vertical axis extending into the vessel, terminating at an end in the approximate center of the vessel, an impeller attached to the end of the shaft adapted to rotate within the wear ring, the impeller being in the form of a circular disc with a plurality of shear blades at the periphery producing a high shear zone between the blades and the wear ring, an inlet in the vessel directly below the impeller on the vertical axis, an outlet in the vessel positioned at a predetermined height directly above the impeller on the vertical axis such that a flow of fluid from the inlet to the outlet passes through the high shear zone, and means to rotate the shaft and impeller.

In a preferred embodiment of the invention the predetermined height of the outlet may be varied above the impeller to control the particle size of the fluid leaving the mill. Thus the properties of a slurry leaving the mill may be adjusted to meet the process requirements.

In another embodiment the shaft extends downwards into the vessel and the outlet is positioned around the shaft. In a further embodiment, the top of the vessel has a conical shape with the outlet being tubular in shape and extending down inside the vessel having a variable height above the impeller and wherein the bottom of the vessel has an inverted conical shape with the inlet being tubular in shape and extending up inside the vessel. The vessel may have a removable annular wear ring. In one embodiment, the width of the high shear zone between the blades and the wear ring is in the approximate range of 1–3 inches and the fluid flow rate through the mill is in the approximate range of 8–11 U.S. gallons per minute. In another embodiment the impeller rotates to produce a peripheral speed in the approximate range of 4,700 to 11,300 feet per minute.

The drawing shows a cross sectional elevation through an embodiment of a continuous high speed grinding and disperser mill.

One embodiment of a high speed grinding and disperser mill is shown in the drawing. The vessel is fabricated from mild or stainless steel and has a top half 10 conical in shape with a tubular outlet 11 extending down inside the vessel and is adjustable for different height positions within the top half 10. The top half 10 is joined to the bottom half 12 and has an annular wear ring 13 between the halves 10 and 12. The bottom half 12 of the vessel has an inverted conical shape with an inlet 14 being tubular in shape and extending up inside the vessel. Drain holes 15 are provided in the side of the tubular inlet 14 to ensure slurry does not remain in the vessel when it is not in use. The top half 10 and bottom half 12 are connected by flanges 16 thus the vessel may be easily separated for maintenance and cleaning purposes. Bolts 17 with special hand nuts 18 hold the two halves 10 and 12 together. When the nuts 18 are slackened, the bolts 17 may be pivoted around a pivot position 19 and the bottom half 12 of the vessel may be lowered from the top half 10 thus allowing the wear ring 13 to be inspected and if necessary replaced. A rotatable shaft 20 extends downwards from the top through the tubular outlet 11 into the approximate center of the vessel between the top half 10 and the bottom half 12 within the wear ring 13 and the impeller 21 is attached to the end of the shaft 20. The impeller 21 is in the form of a circular disc having a plurality of blades 22 at the periphery which rotate axially within the wear ring 13. The space between the blades 22 and the wear ring 13 is the high shear zone 23 and the fluid material or slurry passes through this zone 23 where the dispersion and grinding occur. In one embodiment, the impeller 21 used in the vessel is a commercially available "Cowles hi-shear disc" mounted on shaft 20 driven by a variable speed drive and an electric motor not shown. The peripheral or tip speed of the impeller is preferably in the range of 4,700 to 11,300 feet per minute and the high shear zone 23 between the tip of the impeller blades and the wear ring 13 is preferably in the approximate range of 1–3 inches. The area of the high shear zone 23 may be varied by inserting different sizes of impeller 21 or alternatively inserting a wear ring 13 having a different interior diameter. An overflow chamber 24 and a discharge pipe 25 are prrovided so that dispersed slurries may be fed to surge tanks or storage tanks.

The height of the inlet 14 beneath the impeller 21 can affect the grinding of the particles in the slurry. If the inlet 14 terminates just below the impeller 21, maximum grinding occurs. If the inlet is lower then grinding is decreased but agglomerates in the slurry are broken up. If the area of high shear zone is small, then grinding occurs to the slurry in the vessel, if the area is large then more dispersion occurs with less grinding, and less energy is transferred to the fluid passing through the high shear zone. The height of the outlet 11 is varied depending on particle size required out of the mill. Thus the position of the outlet 11 allows the mill to act as a classifier. If the height of the outlet 11 is lowered, it passes over the hub 21A of the impeller 21 and thus reduces the outlet area. This causes a restriction of the flow through the mill which results in more grinding occurring to particles within the mill and they are ground up to a smaller particle size. When the outlet 11 is raised in the vessel 10, the outlet diameter increases because the impeller hub 21A is outside the outlet 11, the flow through the mill increases and less grinding occurs, therefore, the particle size is larger. By positioning the outlet at different positions in the vessel 10, the particle size in the slurry leaving the mill may be changed.

In one embodiment the area of the inlet 14 is less than the area of the outlet 11 even when the outlet is in its lowest position over the impeller hub 21A, so that there is little or no build up of pressure in the mill which can cause heating. In the case of a finished titanium dioxide pigment, heating can cause a breakdown of organic dispersants.

The material of construction of the vessel is preferably mild or stainless steel. The annular wear ring 13 may be made of mild or stainless steel. The wear ring may be coated with a hard wearing material such as tungsten carbide or in some cases may be a ceramic insert. The shaft 20 is preferably driven through a variable speed drive and an electric motor.

The impeller 21 is preferably a standard Cowles type difuser blade which is a disc having adjacent blades on either side of the disc. The height of the blades above the disc can be varied depending on the extent of grinding required. Higher blades on each side of the disc increase the grinding in the mill.

In operation, a high solids slurry is fed continuously into the entry pipe 14 where it exits on the vertical axis of shaft 20 directly below the impeller 21. As the slurry moves outward it is caught up with the centrifugal force of the impeller which is rotating at high speed within the vessel. Particles which are small enough pass up through the high shear zone 23, larger particles are thrown to the outside of the mill, return to the bottom of the vessel where they swirl around and then pass up through the high shear zone 23 adjacent the wear ring 13. The slurry is agitated vigorously and rotated at high speed due to the centrifugal force from the impeller 21 and blades 22. The larger particles tend to keep to the outside of the vessel and in some cases may fall back into the high shear zone 23. The outlet 11 creates a vortex with the slurry swirling up the conical sides of the top half 10. If the outlet is at it's highest position then the vessel has a low efficiency as a classifier but does break up agglomerates in the slurry. If the outlet 11 is at it's lowest position then the vessel has a maximum efficiency as a classifier, and larger particles are returned to the high shear zone and broken up. The vessel is completely enclosed and does not need vents, therefore, no air is allowed to mix with the slurry. If it is necessary to clean the machine this may be accomplished by undoing the special hand nuts 18 and cleaning out both halves 10 and 12 of the vessel.

The peripheral speed of the impeller 21 may be changed by varying the rotational speed of the shaft 20 to suit the particular material being processed. In the case of a coated titanium dioxide material, if the peripheral speed of the impeller is too slow then there is not sufficient dispersion occuring in the slurry. If the peripheral speed is too fast then the coating may be stripped off the titanium dioxide pigment which is not acceptable.

In one specific embodiment an $11\frac{5}{8}$ inch diameter impeller was tested with a 2.44 inch high shear zone distance between tips of blades and wear ring. The peripheral speed of the impeller was 7,930 feet per minute. The material for the experiment was a high solids slurry containing finished pigment and repulped to at least 63% solids in one case and to at least 76% in another example depending on the pigment use. During each test, samples of the mill slurries were taken and tested for color/tone, tinting strength and to check that the slurry was free from agglomerates. It was apparent that complete homogenization had occurred to the slurry and comparison tests showed that the properties of the resulting slurry were equal if not better than the finished pigment in the dry form. The rheological properties of the slurries were also excellent. It was found that when the flow rate was in the order of 7–11 U.S. gallons per minute, there was a temperature differential through the mill of about 45° F. This differential decreased at higher throughputs due to the slurry acting as a cooling agent in the mill. This high slurry flow allows up to 100 tons of solids per day to be processed through the mill.

It will be apparent to those skilled in the art that various changes could be made to this mill without departing from the scope of the present invention. Conical angles of the top half and bottom half of the vessels may be selected for particular flow and classifier requirements. In some instances it may be desirable to have a cooling jacket surrounding the lower half of the mill. The mill itself may be made of ceramic material to give additional wear properties. The wear ring itself may be easily replaceable, or in some cases may be made integral with the vessel. Alternatively a special coating may be used on the complete inside of the vessel to reduce wear.

The embodiments of the invention in which an exclusive property or privilege is claimed are defined as follows:

1. A continuous high speed grinding and disperser mill and classifier for fluids comprising,
   an enclosed vessel having a conically shaped top and an inverted conically shaped bottom and having an annular wear ring in the approximate center of the vessel,
   a shaft rotatable about a vertical axis extending downwards into the vessel terminating at an end in the approximate center of the vessel,
   an impeller attached to the end of the shaft adapted to rotate within the wear ring, the impeller being in the form of a circular disc with a plurality of shear blades at the periphery producing a high shear zone between the blades and the wear ring, an axially directed inlet extending up into the vessel and being directly below the impeller on the veritcal axis, an outlet extending downward into the vessel positioned around the shaft and at a predetermined height directly above the impeller on the vertical axis such that a flow of fluid from the inlet to the outlet passes through the high shear zone, and means to rotate the shaft and impeller.

2. The mill according to claim 1, wherein the inlet is tubular and may be set at a variable distance below the impeller and wherein said tubular inlet has drain holes to prevent fluid remaining in the mill.

3. The mill according to claim 1 wherein the predetermined height of the outlet may be set at a variable distance above the impeller.

4. The mill according to claim 1 wherein the width of the high shear zone between the blades and the wear ring is in the approximate range of 1–3 inches.

5. The mill according to claim 1 wherein the inlet is connected to a source of fluid which provides a flow rate through the mill in the approximate range of 7 to 11 U.S. gallons per minute.

6. The mill according to claim 1 wherein the peripheral speed of the impeller is in the approximate range of 4,700 to 11,300 feet per minute.

7. The mill according to claim 1 wherein the mill contains a fluid containing at least 60% solid matter.

8. The mill according to claim 1 wherein the annular ring is removable.

9. The mill according to claim 1 wherein the inside of the vessel and the wear ring are coated with abrasion resistant materials.

10. A continuous high speed grinding and disperser mill and classifier for fluids comprising, an enclosed vessel having an annular wear ring in the approximate center of the vessel, a shaft rotatable about a vertical axis extending into the vessel terminating at an end in the approximate center of the vessel, an impeller attached to the end of the shaft adapted to rotate within the wear ring, the impeller being in the form of a circular disc with a plurality of shear blades at the periphery producing a high shear zone between the blades and the wear ring, an axially directed inlet in the vessel directly below the impeller on the vertical axis, an outlet in the vessel positioned at a predetermined height directly above the impeller on the vertical axis such that a flow of fluid from the inlet to the outlet passes through the high shear zone, the inlet and outlet being constructed such that the area of the inlet is less than the area of the outlet, and means to rotate the shaft and impeller.

* * * * *